Dec. 12, 1944.     G. T. DOWNEY     2,365,063
BELLOWS FOR VALVE STRUCTURES
Filed Feb. 19, 1943
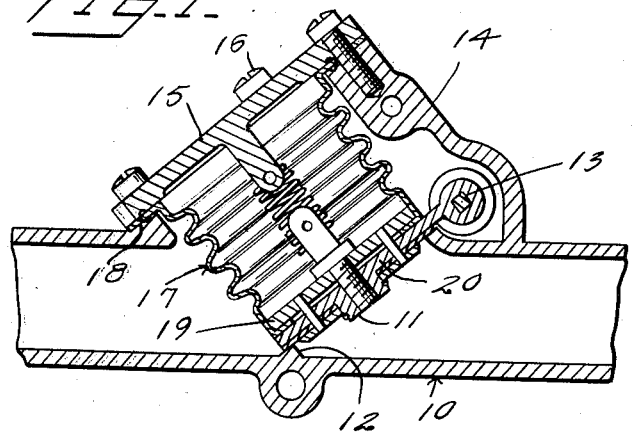
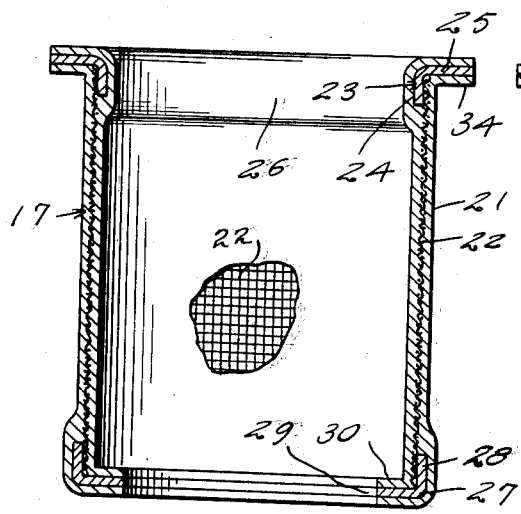
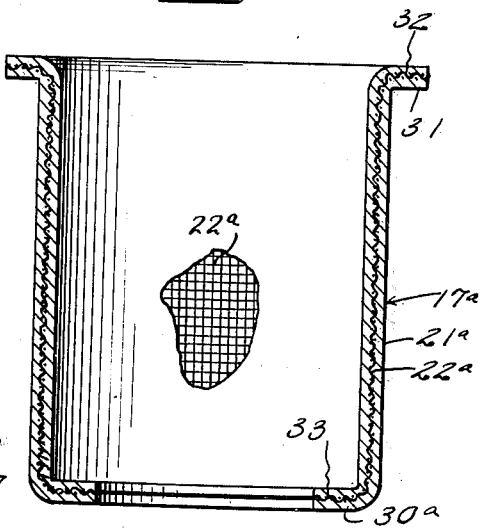
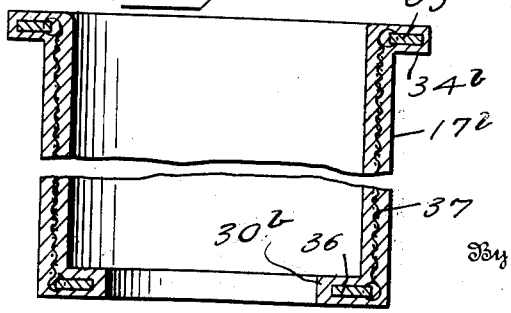
Inventor
G. T. Downey
By Kimmel & Crowell
Attorneys Patented Dec. 12, 1944

2,365,063

UNITED STATES PATENT OFFICE 2,365,063

BELLOWS FOR VALVE STRUCTURES

George T. Downey, Corry, Pa., assignor to Aero Supply Mfg. Co. Inc., Corry, Pa.

Application February 19, 1943, Serial No. 476,445

7 Claims. (Cl. 137—156.5)

This invention relates to a flexible seal for encompassing a movable valve.

An object of this invention is to provide a flexible bellows or seal for a movable valve which will encompass a valve operator wherein the operator may be of either the electrical, hydraulic or mechanical type.

Another object of this invention is to provide a flexible bellows which may be formed of rubber and within which is embedded a flexible metal reinforcing fabric.

A further object of this invention is to provide a flexible reinforced bellows which has embedded therein at each end cup-shaped flanges for providing a firm means to secure the ends of the bellows to the valve housing and to the movable valve.

To the foregoing objects and others which may hereinafter appear, the invention consists of the novel construction, combination and arrangement of parts as will be more specifically referred to and illustrated in the accompanying drawing, wherein is shown an embodiment of the invention, but it is to be understood that variations, modifications and changes may be resorted to which fall within the scope of the invention as claimed.

In the drawing:

Figure 1 is a longitudinal section of a typical valve with which the flexible bellows embodied in this invention is adapted to be used, the bellows being diagrammatically shown, Figure 2 is a vertical section partly broken away of the bellows, Figure 3 is a vertical section partly broken away of a modified form of bellows, Figure 4 is a longitudinal section of another form of this invention, and Figure 5 is a fragmentary sectional view of one end of the reinforcing structure embedded in the resilient body.

Referring to the drawing, the numeral 10 designates generally a valve housing which has mounted on the interior thereof a valve plate or member 11. The valve member 11 is adapted to seat on a seat 12 which in the present instance is inclined to the longitudinal axis of the housing 10. The valve member 11 is rockably mounted on a rock shaft 13 which may be provided with any suitable operating means exteriorly of the housing 10. An offset housing 14 is formed integral with the valve housing 10 and the valve member 11 is adapted to swing outwardly into the housing 14 when the valve member 11 is in open position. A closure 15 is secured by fastening members 16 to the housing 14 and a flexible bellows or seal member 17 is interposed between the closure 15 and a seat 18. The closure 15 is also interposed at its inner end between a clamping plate 19 carried by the valve member 11 and the valve plate 20.

The valve structure herein disclosed is merely illustrative of one type of a valve structure with which the flexible bellows, to be hereinafter described, is adapted to be used. The bellows 17 comprises an initially cylindrical body 21, as shown in Figure 2, which is adapted to be formed of rubber or other flexible material. The yieldable cylindrical body 21 has embedded therein a cylindrical flexible metallic fabric 22. The fabric 22 may be formed of wire mesh, or if desired may be formed of interengaging rings, which is adapted to be disposed midway between the inner and outer surfaces of the body 21. The outer end of the body 21 also has embedded therein a metal flange 23.

The flange 23 includes a cylindrical member 24 which is positioned interiorly of the outer end of the fabric 22 and which may be soldered or otherwise fixedly secured to the fabric 22. The cylindrical member 24 has formed integral therewith an annular flange 25 and the member 24 with the flange 25 is embedded within the material forming the bellows 17, as shown in Figure 2 so that the flexible or resilient material forming the bellows 22 will provide a seal on opposite sides of the flange 25 when the outer end of the bellows is interposed between the closure plate 15 and the seat 18.

The bellows 17 at its outer end portion is reduced in diameter as at 26, due to the embedding of the cylindrical flange member 24 within the bellows interiorly of the metal fabric 22.

The inner end of the bellows 17 also has embedded therein a metal reinforcing flange 27. The flange 27 includes a cylindrical member 28 which encompasses the inner end of the metal fabric 22 and which may be secured as by soldering, welding or the like to the periphery of the fabric 22 at the inner end thereof. An inwardly projecting annular flange 29 is formed integral with the cylindrical flange 28, and the bellows 17 at its inner end is inturned so as to provide an inwardly projecting flange 30 engaging on opposite sides of the annular metal flange 29.

Referring now to Figure 3, there is disclosed a slightly modified form of bellows wherein a bellows 17a is provided having a cylindrical resilient or rubber body 21a. The body 21a has embedded therein a flexible metal fabric 22a and the outer end of the cylindrical body 21a is formed with an annular flange 31 within which the outer end portion of the reinforcing metal fabric 22a is adapted to be embedded, the fabric 22a forming a metal and flexible flange 32.

The inner end of the bellows 17a is formed with an inwardly projecting flange 32a and the metal fabric 22a is extended inwardly interiorly of the flange 30a, as shown at 33, so as to form a flexible reinforcing flange within the rubber or yieldable flange 30a.

Referring now to Figures 4 and 5, the numeral 17b designates generally a cylindrical body of flexible material, such as rubber or the like, having an outwardly projecting flange 34b at one end thereof and an inwardly projecting flange 30b at the opposite end thereof. A flat metal ring 35 is embedded in the flange 34b and a flat metal ring 36 is embedded in the flange 30b. The outer diameter of the body 17b and the inner diameter of the ring 36 is less than the inner diameter of the body 17b. A flexible metallic cloth 37 is embedded in the body 17b, is secured at one end thereof to the inner circle of the ring 35 and is secured at the other end to the outer circle of the ring 36.

In Figure 5 there is disclosed the method of and means for securing the fabric 37 to the two metal rings. It will be noted that the fabric 37 is formed of interengaging rings and a wire 38 is threaded through the rings at one end of the fabric 37 and is then threaded through holes 39 formed in the ring 35. The opposite end of the fabric is secured to the ring 36 by means of a securing wire 40 engaging through outer holes formed in the outer portion of the ring 36.

In the use of this bellows structure, the outer end of the bellows 17 is adapted to have the flange 34 thereof interposed between the closure 15 and the seat 18. The inner end of the bellows 17 has the flange 30 thereof interposed between the clamping plate 19 and the valve plate 20 forming part of the valve member 11. The operator 13 may then be actuated to move the valve member 11 off of the seat 12, and in this movement the bellows 17 will flex or be compressed while at the same time sealing the elements secured to the valve member 11 interiorly of the bellows 17. By providing a bellows as hereinbefore described, which is reinforced by a metal fabric, the bellows will not readily crack or break during the flexing thereof. In addition, the provision of the embedded metal flanges within the bellows which are also fixedly secured to the metal fabric provide firm means at the opposite ends of the bellows for securing the ends of the bellows to the valve housing and the movable valve member.

What I claim is:

1. A bellows for a valve structure comprising a non-metallic flexible tubular body, rigid flange members embedded in said body at the ends of the latter, and a flexible metallic fabric embedded in said body between said flange members.

2. A bellows for a valve structure comprising a flexible tubular body, rigid flange members embedded in said body at the ends of the latter, one of said members including a cylindrical flange and an outwardly extending annular flange, the other of said members including a cylindrical flange and an inwardly extending annular flange, and a flexible metallic fabric embedded in said body between said flange members.

3. A bellows for a valve structure comprising a flexible tubular body, rigid flange members embedded in said body at the ends of the latter, one of said members including a cylindrical flange and an outwardly extending annular flange, the other of said members including a cylindrical flange and an inwardly extending annular flange, and a flexible metallic fabric embedded in said body and telescoping said cylindrical flanges.

4. A bellows for a valve structure comprising a flexible tubular body, rigid flange members embedded in said body at the ends of the latter, one of said members including a cylindrical flange and an outwardly extending annular flange, the other of said members including a cylindrical flange and an inwardly extending annular flange, and a flexible metallic fabric embedded in said body and fixedly secured at the opposite ends thereof to said annular flanges.

5. A bellows for a valve structure comprising a flexible tubular body, an outwardly projecting metallic flange forming ring embedded in one end of said body, an inwardly projecting flange forming ring embedded in the other end of said body, and a flexible perforate metallic fabric embedded in said body and secured to said rings.

6. A bellows for a valve structure comprising a flexible tubular body, a flat ring embedded in said body at one end thereof and having an outer diameter greater than the outer diameter of said body to thereby form an outwardly projecting flange, an inwardly projecting flat ring embedded in the opposite end of said body and having an inner diameter less than the inner diameter of said body to thereby form an inwardly projecting flange, and a flexible metallic fabric secured at one end to the inner edge of said first ring and at the other end to the outer ends of said second ring.

7. A bellows for a valve structure comprising a non-metallic flexible tubular body, rigid flange members embedded in said body at the ends of the latter, and a flexible metallic fabric embedded in said body between said flange members, said fabric being formed of interengaging rings.

GEORGE T. DOWNEY.